United States Patent
Fingerman et al.

(10) Patent No.: US 9,151,172 B2
(45) Date of Patent: Oct. 6, 2015

(54) STATOR AND TORQUE CONVERTER CONTAINING THE SAME

(71) Applicants: Michael Fingerman, West Bloomfield, MI (US); Darrin C Raley, Clarkston, MI (US)

(72) Inventors: Michael Fingerman, West Bloomfield, MI (US); Darrin C Raley, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 408 days.

(21) Appl. No.: 13/680,670

(22) Filed: Nov. 19, 2012

(65) Prior Publication Data

US 2014/0137547 A1    May 22, 2014

(51) Int. Cl.
*F01D 9/04* (2006.01)
*F16H 41/26* (2006.01)
*F16H 41/28* (2006.01)
*F16H 45/02* (2006.01)

(52) U.S. Cl.
CPC *F01D 9/04* (2013.01); *F16H 41/26* (2013.01); *F16H 2041/285* (2013.01); *F16H 2045/0205* (2013.01)

(58) Field of Classification Search
CPC ......... F16D 33/00; F16D 33/18; F16D 33/20; F16H 41/24; F16H 41/26; F16H 41/28
USPC .......................................................... 60/330
See application file for complete search history.

(56) References Cited

U.S. PATENT DOCUMENTS

| | | | |
|---|---|---|---|
| 2,821,839 A | 2/1958 | Lucien | |
| 3,192,862 A | 7/1965 | Schrader, Jr. | |
| 3,940,929 A * | 3/1976 | Bezimensky | 60/330 |
| 5,005,356 A | 4/1991 | Saunders | |
| 5,168,702 A * | 12/1992 | Sakakibara et al. | 60/345 |
| 5,918,461 A * | 7/1999 | Bacon | 60/343 |
| 6,003,311 A | 12/1999 | Takada et al. | |
| 6,502,994 B2 | 1/2003 | Jackson | |
| 6,993,903 B2 | 2/2006 | Shin | |
| 7,080,720 B1 | 7/2006 | Yarborough et al. | |
| 7,083,381 B2 | 8/2006 | Shue | |
| 7,565,958 B1 * | 7/2009 | Dumas | 192/3.29 |
| 7,621,122 B2 | 11/2009 | Marathe et al. | |
| 7,887,240 B2 | 2/2011 | Marathe et al. | |
| 7,891,179 B2 * | 2/2011 | Parks | 60/364 |
| 7,937,937 B2 * | 5/2011 | Wolf et al. | 60/330 |
| 7,938,243 B2 * | 5/2011 | Avins et al. | 192/204 |
| 2004/0172936 A1 * | 9/2004 | Mueller et al. | 60/330 |
| 2007/0029151 A1 | 2/2007 | Avins et al. | |
| 2007/0144161 A1 | 6/2007 | Marathe et al. | |
| 2008/0308373 A1 | 12/2008 | Wiegert | |
| 2009/0205916 A1 | 8/2009 | Peri | |
| 2009/0238505 A1 | 9/2009 | Jameson | |
| 2009/0241533 A1 | 10/2009 | Marathe | |
| 2001/0123349 | 5/2011 | Olsen | |

FOREIGN PATENT DOCUMENTS

GB     1485029 A     9/1977
JP     2010156391 A  7/2010

OTHER PUBLICATIONS

International Search Report and Written Opinion dated Feb. 19, 2014 for International Application No. PCT/US2013/070475, International Filing Date Nov. 18, 2013.

* cited by examiner

*Primary Examiner* — Thomas E Lazo
(74) *Attorney, Agent, or Firm* — Ralph E. Smith (57) ABSTRACT

The present disclosure relates to a torque converter, and more particularly, to a torque converter containing a stator having blades with non-linear edges and non-ruled surfaces to increase fluid flow within the torque converter and improve the performance thereof.

17 Claims, 11 Drawing Sheets

STATOR AND TORQUE CONVERTER CONTAINING THE SAME

FIELD OF THE INVENTION

The present disclosure relates to a torque converter, and more particularly, to a torque converter containing a stator having non-ruled blades surfaces to reduce fluid losses and improve performance.

BACKGROUND OF THE INVENTION

A torque converter is a fluid-filed assembly typically used in automatic and powershift transmissions. A torque converter uses fluid to transmit energy from an input, typically an engine, to an output, typically a transmission, and consists of three main components: a turbine, an impeller, and a stator. During the operation of a torque converter, torque generated from the engine drives the impeller. A cover is attached to the impeller so both the cover and impeller rotate at the same speed as the engine. The turbine is connected to an output shaft, and the stator is connected to a non-rotating support shaft. The turbine and impeller have a plurality of blades oriented so that as the impeller rotates, the fluid within the impeller is forced into the blades of the turbine, transmitting energy to the turbine, and forcing it to rotate. The stator has a plurality of blades oriented to direct the fluid leaving the turbine to flow in the direction of the impeller's rotation rather than in a direction opposing the impeller's rotation.

A thrust washer is a component used within many torque converters to ensure the proper location of the torque converter's component parts, and is typically located between the impeller and the cover. It is desirable to route fluid through the torque converter to ensure proper functioning. One of the fluid pathways within a torque converter can be around or through the thrust washer. A typical thrust washer contains a multitude of straight grooves on the surface to allow for fluid communication within the torque converter.

In a traditional torque converter, the turbine, impeller, and stator are each made up of a plurality of blades having ruled surfaces (or a surface generated by a straight line). As the fluid travels through the channels created by the blades of a traditional torque converter, fluid losses are generated when the fluid flow becomes turbulent. Fluid losses lead to overall performance deterioration and decreased torque converter efficiency. Furthermore, as some automotive designs provide for decreased space for transmission systems, and as automatic transmissions have increased in size over time due to the use of more gears, a need has developed for a torque converter that is smaller in size. Decreasing the overall dimensions of a torque converter decreases the size of the channels created by the blades, further increasing the buildup of fluid losses. Accordingly, there is a need for improvement in the art.

SUMMARY OF THE INVENTION

The present disclosure broadly comprises a stator designed to allow superior fluid flow and increase overall torque converter efficiency. The stator according to an aspect of the present invention contains a plurality of blades that have non-ruled surfaces. This unique shape of the blades assists in reducing fluid losses by improving the geometry of the channels through which the fluid within the stator flows.

The stator blades extend from an inner circumference of the stator to an outer circumference of the stator, and direct the flow of the fluid leaving the turbine output and entering the impeller input. In comparison to traditional stator blade designs that utilize linear edges and ruled-surfaces, the stator blades according to an aspect of the present invention have non-linear leading and trailing edges between the inner circumference and the outer circumference of the stator. Non-linear edges give the stator blades non-ruled surfaces which serve to decrease fluid separation from the blade surfaces. This decreases fluid losses and, in-turn, increases torque converter efficiency by providing an increased fluid flow rate within torque converter.

In one embodiment, the leading edge and the trailing edge of the stator blades are contoured such that the stator blades have a convex front surface and concave rear surface. In another embodiment, the leading edge and the trailing edge of the stator blades are contoured such that the stator blades have a concave front surface and convex rear surface.

In yet another embodiment, the stator blades are non-linear from the leading edge of the stator blade to the trailing edge of the stator blade. In yet another embodiment, the stator blades have an airfoil shaped cross section. In yet another embodiment, the stator blades have a uniform cross section.

The shape of the impeller blades and the turbine blades of a torque converter are defined by the shape of the space in which the impeller and turbine fit within the torque converter. The impeller blades have an outer edge arranged to conform to the inner surface of the torque converter cover, and an inner edge arranged to conform to the outer surface of a torus ring. The turbine blades have a similar shape, with an outer edge arranged to conform to the inner surface of a turbine shell, and an inner edge arranged to conform to the outer surface of the torus ring. The inner edges of the impeller blades are arranged to face the inner edges of the turbine blades such that as the impeller spins, fluid leaving the impeller output enters the turbine input.

In yet another embodiment of the present invention, the torque converter contains non-ruled impeller blades and turbine blades usable with the stator of the present invention. In comparison to traditional blade designs that utilize ruled blade surfaces, non-ruled impeller and turbine blades serve to increase the flow rate of the fluid through the channels created by adjacent blades, and therefore further decrease fluid losses within the torque converter.

In yet another embodiment of the present invention, the torque converter contains a thrust washer usable with the stator of the present invention, wherein the thrust washer contains at least one groove on its front surface, and the front surface is curved such that the thickness of the thrust washer at the inner diameter is greater then the thickness of the thrust washer at the outer diameter. In comparison to traditional thrust washer designs, the present design increases the length of the at least one groove, allowing for a greater reduction in the velocity of the fluid traveling through the groove which, in turn, lessens fluid turbulence and further increases the fluid flow rate within the torque converter.

In yet another embodiment of the present invention, the thrust washer includes at least one groove having a width that is greater at the outer diameter of the thrust washer than at a point proximal to the inner diameter of the thrust washer. This creates a wider entry area to further increase the fluid flow rate within the torque converter.

In yet another embodiment of the present invention, the at least one groove of the thrust washer has one side that is substantially straight, and one side that is curved along at least part of a length thereof such that the groove is wider at the outer diameter of the thrust washer than at a point proximal to the inner diameter of the thrust washer.

In yet another embodiment of the present invention, the at least one groove of the thrust washer has both sides that are curved along at least part of their length such that the geometry of the curve of the first side in relation to the curve of the second side creates a groove that is wider at the outer diameter of the thrust washer than at a point proximal to the inner diameter of the thrust washer.

In yet another embodiment of the present invention, the at least one groove of the thrust washer extends completely from the outer diameter to the inner diameter.

In yet another embodiment of the present invention, the thrust washer includes a plurality of grooves arranged radially about the front surface of the thrust washer, and the thrust washer also includes at least one protrusion extending outward from the front surface in proximity to the inner diameter, and between each of the plurality of grooves.

Further areas of applicability of the present disclosure will become apparent from the detailed description provided hereinafter. It should be understood that the detailed description, including disclosed embodiments and drawings, are mere exemplary in nature intended for purposes of illustration only and are not intended to limit the scope of the invention, its application or use. Thus, variations that do not depart from the gist of the invention are intended to be within the scope of the invention.

DESCRIPTION OF THE INVENTION

Figure 1:
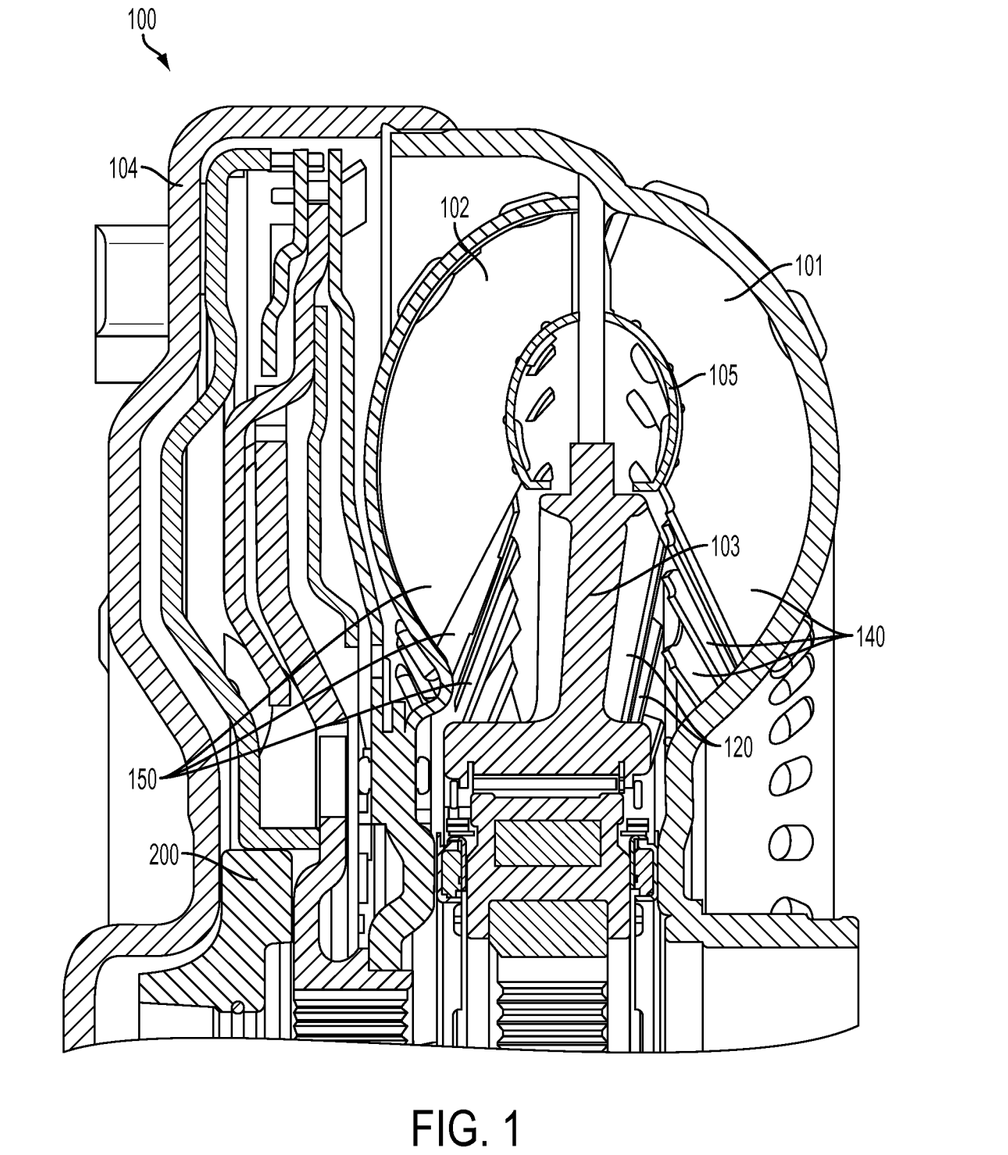
FIG. 1 is a cross sectional view of a stator in a torque converter according to an embodiment of the present invention.

FIG. 1 is a cross sectional view of a torque converter 100 showing the location of an impeller 101, turbine 102, stator 103, cover 104, torus ring, 105, and thrust washer 200. During operation of the torque converter 100, torque generated from the engine (not shown) drives the impeller 101. The cover 104 is attached to the impeller 101, so both the cover 104 and the impeller 101 rotate at the same speed as the engine. The turbine 102 has a plurality of turbine blades 150 and the impeller 101 has a plurality of impeller blades 140 oriented so that as the impeller 101 rotates, the fluid within the impeller 101 is forced out of the impeller 101 into the turbine 102, transmitting energy to the turbine 102 and forcing it to rotate. The stator 103 has a plurality of stator blades 120 oriented to direct the fluid leaving the turbine 102 into the impeller 101 in the rotational direction of the impeller 101 rather than in a direction opposing the impeller's rotation.

Figure 2:
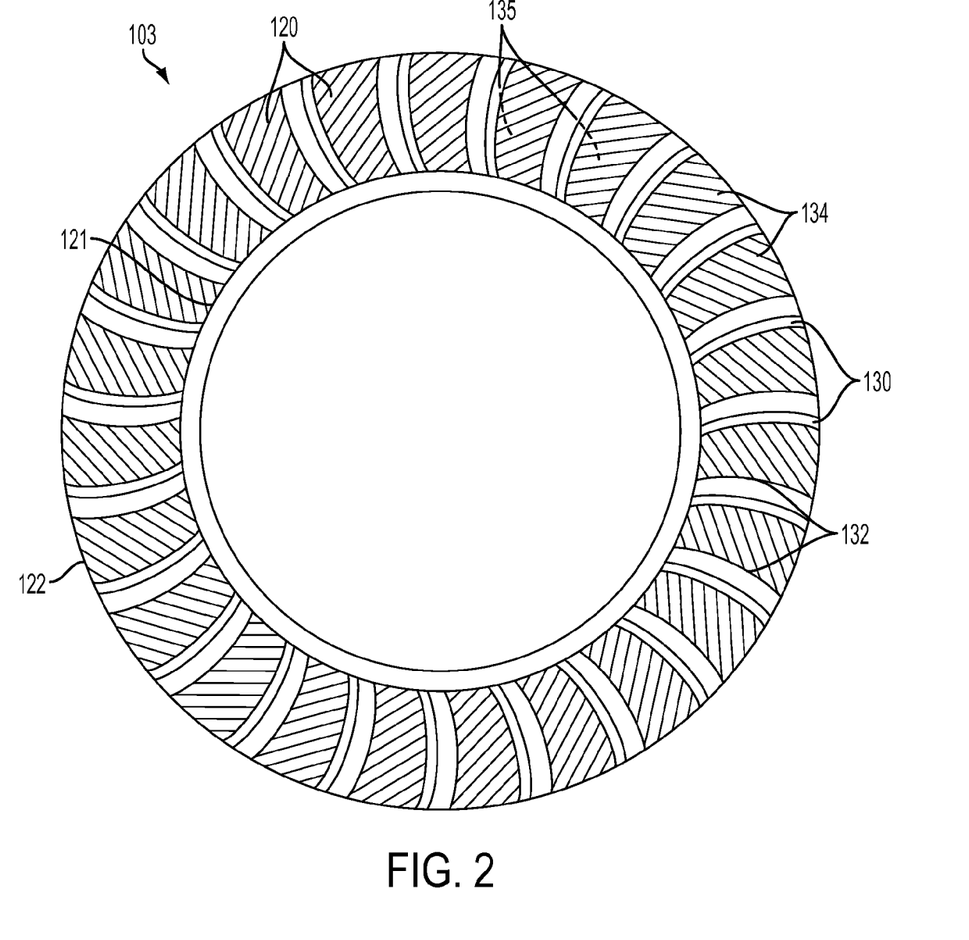
FIG. 2 is a front view of a stator according to an embodiment of the present invention.
Figure 3:
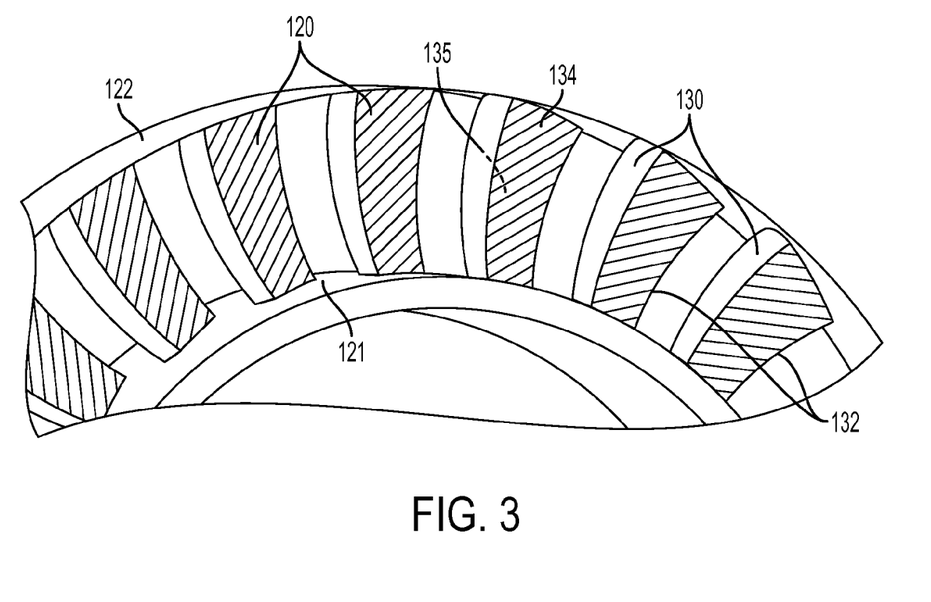
FIG. 3 is a perspective view of the stator of FIG. 2.

FIGS. 2 and 3 show a stator 103 according to a present embodiment. The stator 103 has a plurality of stator blades 120 extending from an inner circumference 121 to an outer circumference 122 of the stator 103. Each stator blade 120 has a leading edge 130 and a trailing edge 132. The leading edge 130 and trailing edge 132 are non-linear from the inner circumference 121 to the outer circumference 122, thereby creating non-ruled front stator blade surfaces 134 and rear stator blade surfaces 135. The non-ruled surfaces of the stator blades 120 assist in increasing the fluid flow rate within the channels between the stator blades 120, which thereby decreases fluid losses and increases torque converter efficiency. These non-ruled stator blade surfaces decrease fluid separation from the stator blade surfaces thus decreasing fluid turbulence and increasing torque converter efficiency.

Figure 4:
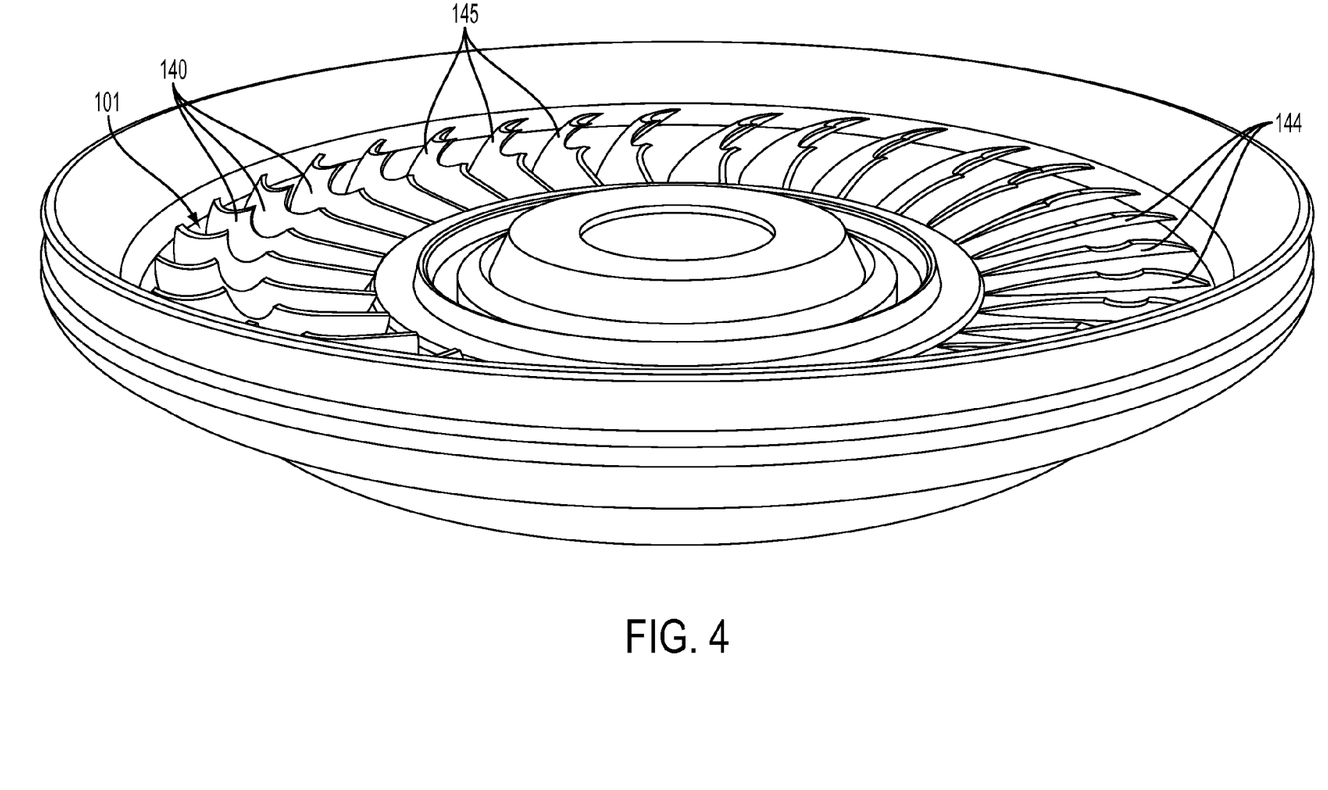
FIG. 4 is a perspective view of an impeller according to an embodiment of the present invention.

FIG. 4 shows an embodiment of an impeller 101 usable with the stator of the present invention. The impeller 101 has a plurality of impeller blades 140 having a non-ruled surface. In particular, the impeller blades 140 are contoured such that each impeller blade 140 has a non-ruled front impeller blade surface 144 (blade pressure side) and a non-ruled rear impeller blade surface 145 (blade suction side). These non-ruled surfaces serve to further increase the flow rate of the fluid through the channels created by adjacent impeller blades 140. These non-ruled impeller blade surfaces decrease fluid separation from the impeller blade surfaces thus decreasing fluid turbulence and further increasing torque converter efficiency.

Figure 5:
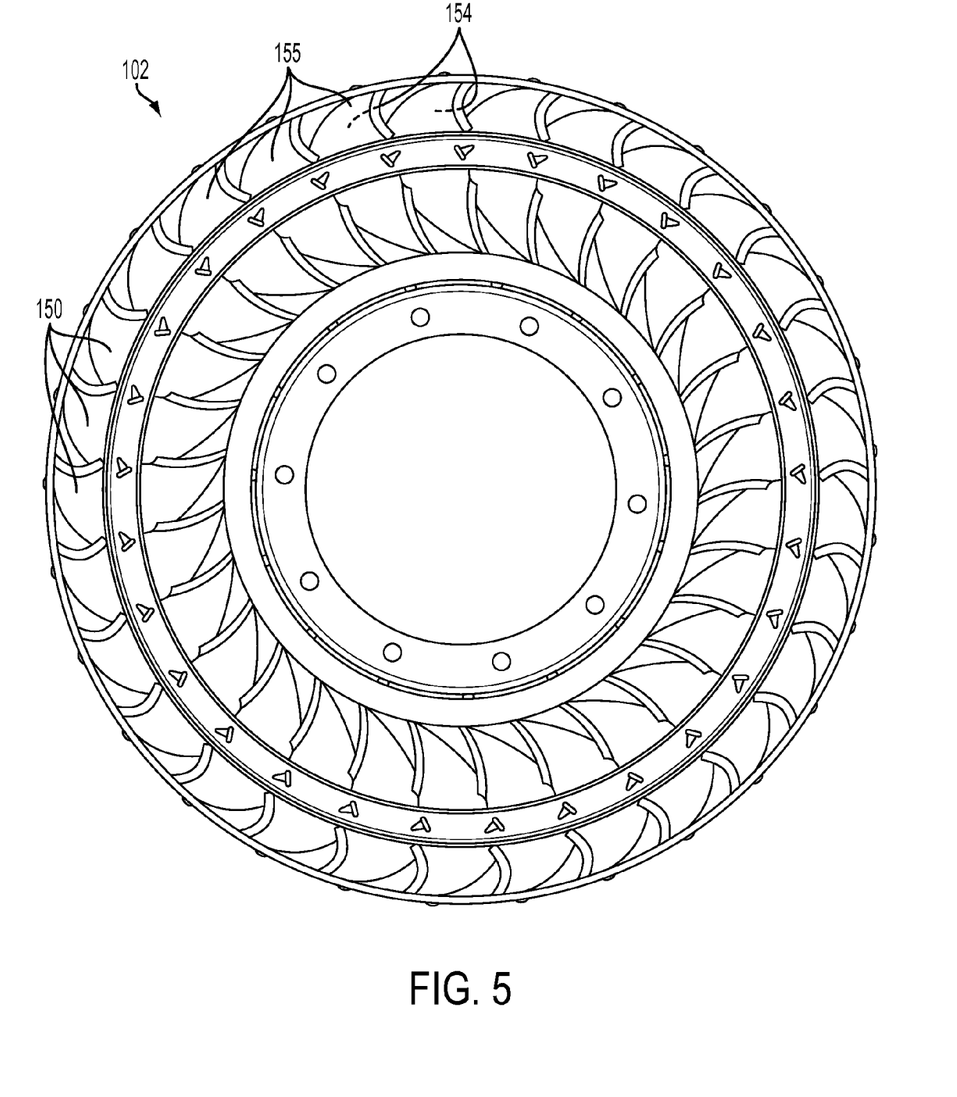
FIG. 5 is a front view of a turbine according to an embodiment of the present invention.

FIG. 5 shows an embodiment of a turbine 102 according to the present invention. In this embodiment the turbine 102 has a plurality of turbine blades 150 having a non-ruled surface. In particular, turbine blades 150 are contoured such that each turbine blade 150 has a non-ruled front turbine blade surface 154 and a non-ruled rear turbine blade surface 155. These non-ruled turbine blade surfaces serve to further increase the flow rate of the fluid through the channels created by adjacent turbine blades 150, and therefore further decrease fluid losses within the torque converter 100. These non-ruled turbine blade surfaces decrease fluid separation from the turbine blade surfaces thus decreasing fluid turbulence and further increasing torque converter efficiency.

Figure 6:
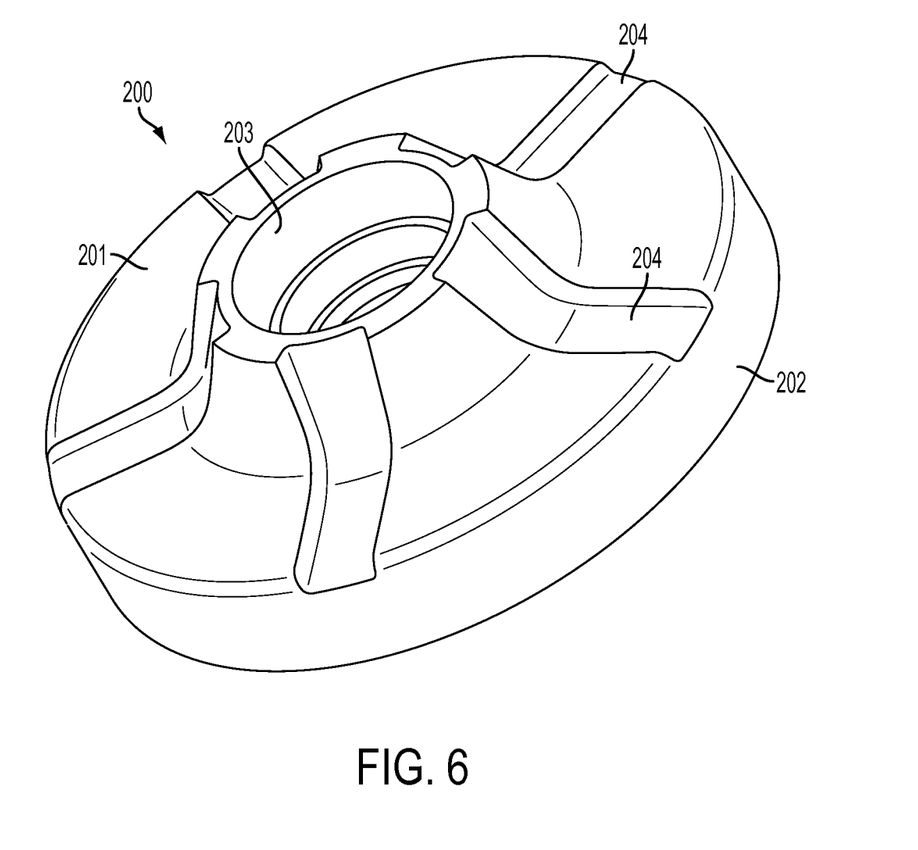
FIG. 6 is a perspective view of a thrust washer according to an embodiment of the present invention.
Figure 7:
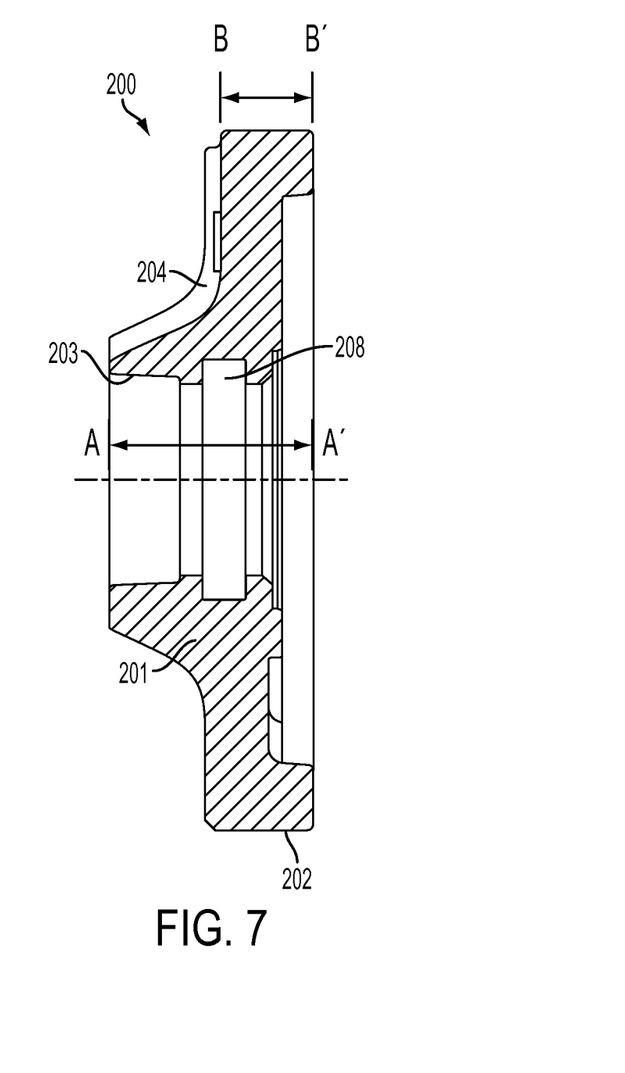
FIG. 7 is a side view of the thrust washer of FIG. 6.

FIGS. 6 and 7 show an embodiment of a thrust washer 200 usable with the stator of the present invention. The thrust washer 200 has an annular body 201 with an outer diameter 202 and an inner diameter 203. The exemplary thrust washer 200 depicted has a front surface that is curved such that a thickness of the thrust washer 200 is greater at the inner diameter 203 than at the outer diameter 202. The thrust washer 200 has at least one curved groove 204 located in the front surface of the thrust washer 200. The groove 204 extends along the curved front surface from the outer diameter 202 towards the inner diameter 203. The groove 204 follows the curved contour of the front surface of the thrust washer 200 and allows for fluid communication between the inner diameter 203 and the outer diameter 202 when the thrust washer 200 is installed in a torque converter. The exemplary embodiment shown in FIG. 6 depicts a plurality of spaced apart grooves. The groove(s) route fluid through the torque converter. In one torque converter operating (lock-up) mode, fluid is routed through the groove in a direction from the outer diameter 202 of the thrust washer toward the inner diameter 203. In another torque converter operating (open converter/cooling) mode, fluid is routed through the groove in a direction from the inner diameter 203 of the thrust washer toward the outer diameter 202. This design increases the length of groove 204, allowing for a greater reduction in the velocity of the fluid traveling through groove 204 which, in turn, lessens fluid turbulence and increases the flow rate. The increased flow rate alleviates the buildup of back pressure.

As shown in FIG. 7, the thrust washer inner diameter thickness (A-A') is greater than the thrust washer outer diameter thickness (B-B'). As further shown in FIG. 7, the inner diameter 203 has a cavity 208 therein configured to connect with the output shaft (not shown). As one of skill in the art would readily understand, the inner diameter cavity can have many different configurations dependant upon the corresponding configuration of the output shaft.

Figure 8:
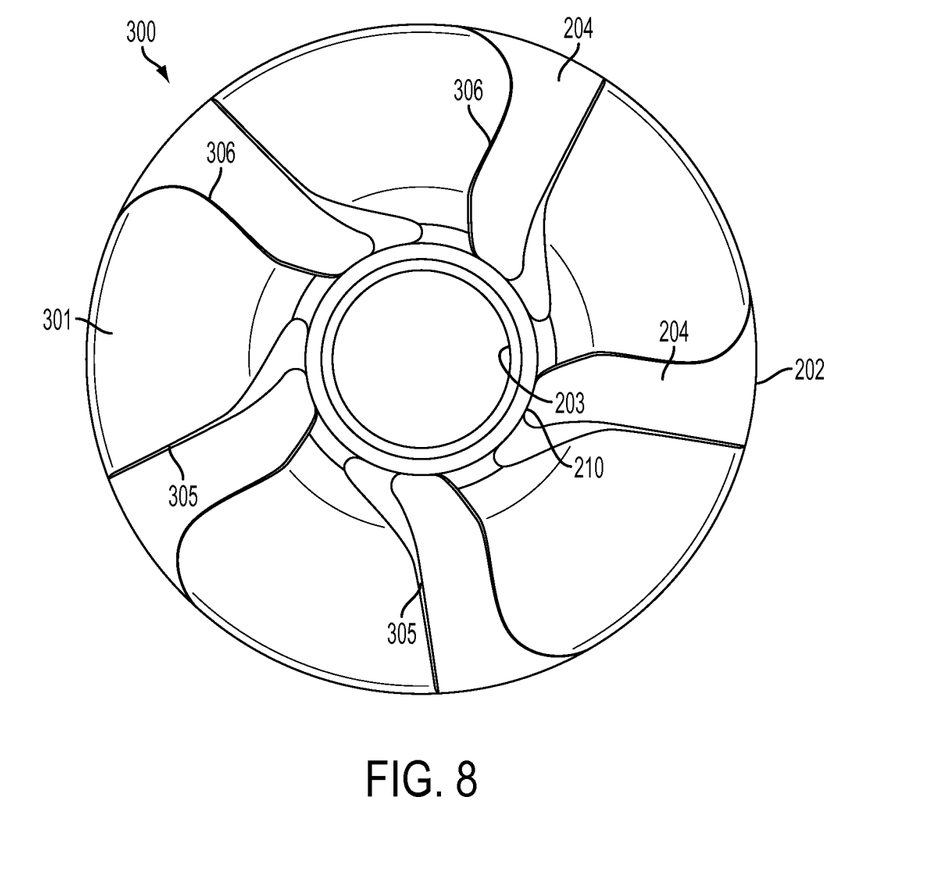
FIG. 8 is a front view of a second embodiment of a thrust washer according to the present invention.

FIG. 8 is a front view of a second embodiment of a thrust washer 300 usable with the stator of the present invention. In this embodiment, the grooves 204 have a width that is wider at the outer diameter 202 than at a point proximal 210 to the inner diameter 203 of the thrust washer 300. In FIG. 8, like or corresponding parts are indicated by like reference numerals as used in FIGS. 6 and 7 and the repeated explanations thereof are omitted. In this second embodiment, the grooves 204 have a first side 305 that is substantially straight at the entry area of the groove 204, and a second side 306 that is curved along at least a portion of a length thereof. The curvature of the second side 306 creates a groove 204 that is wider at the outer diameter 202 than at a point proximal 210 to the inner diameter 203 of the thrust washer 300. This creates a wider entry area to further increase the fluid flow rate within the torque converter.

Meanwhile, in all of the drawings attached to this specification, like or corresponding parts are indicated by like reference numerals and the repeated explanations thereof are omitted herein.

Figure 9:
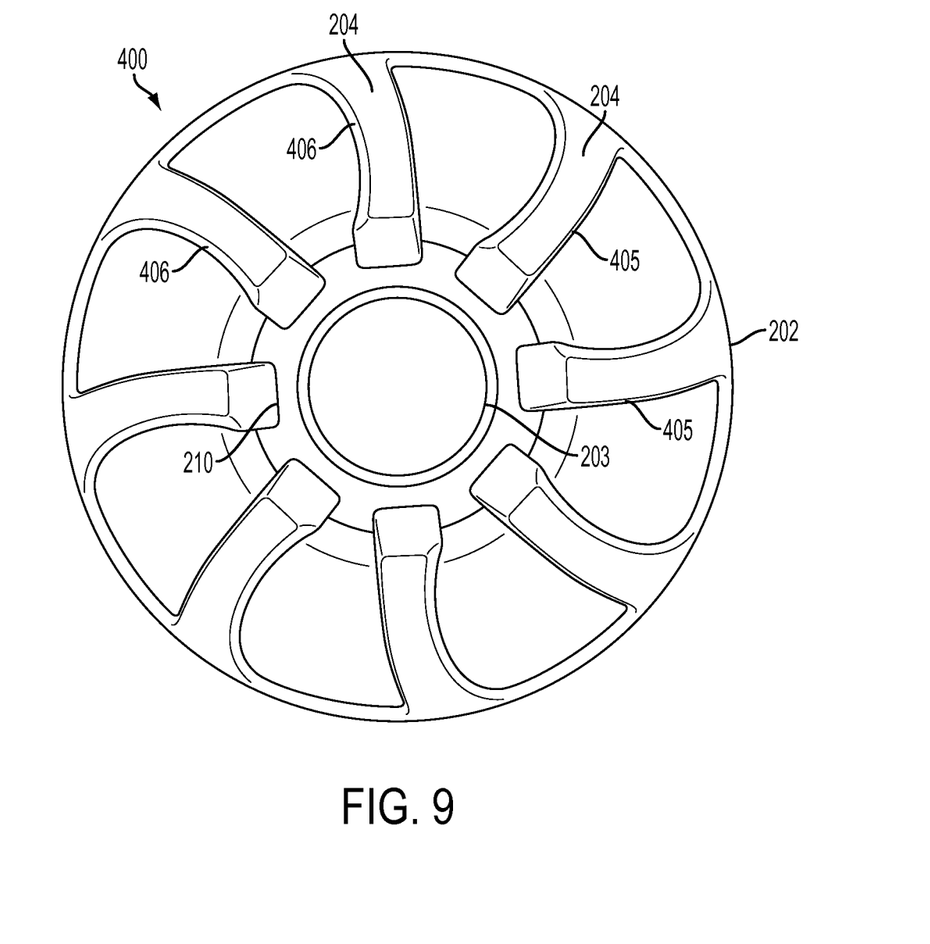
FIG. 9 is a front view of a third embodiment of a thrust washer according to the present invention.

FIG. 9 is a front view of a third embodiment of the thrust washer 400 usable with the stator of the present invention. In this third embodiment, the grooves 204 have both sides curved along at least part of their length. The geometry of the curve of the first side 405 in relation to the curve of the second side 406 creates a groove 204 that is wider at the outer diameter 202 than at a point proximal 210 to the inner diameter 203 of the thrust washer 400. This creates a wider entry area that increases the fluid flow rate within the torque converter.

Figure 10:
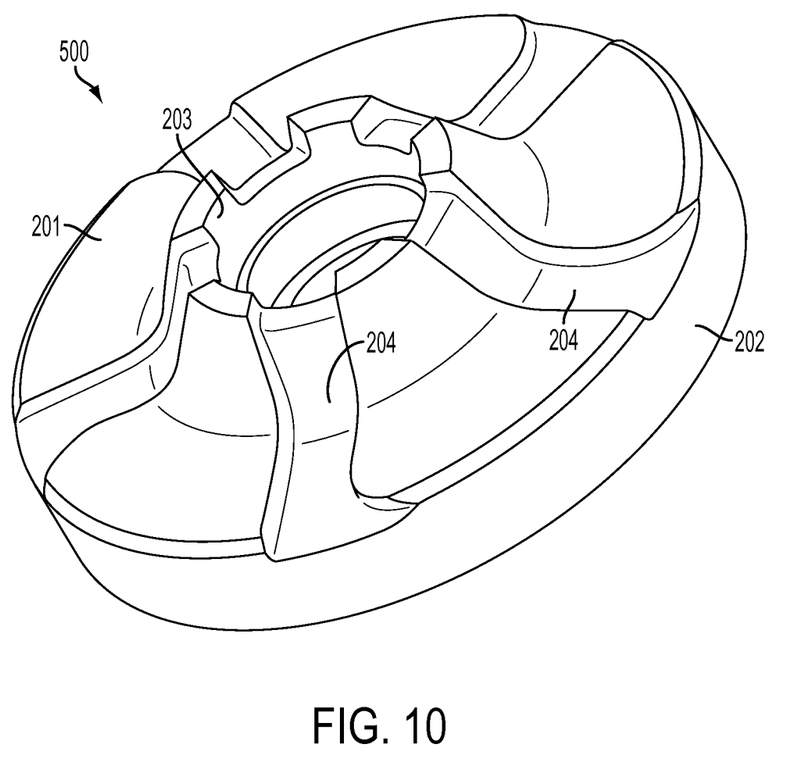
FIG. 10 is a perspective view of a fourth embodiment of a thrust washer according to the present invention.

FIG. 10 is a perspective view of a fourth embodiment of a thrust washer 500 usable with the stator of the present invention. In this fourth embodiment, the grooves 204 extend completely from the outer diameter 202 to the inner diameter 203 of the thrust washer 500. This design allows for the fluid to pass through the groove 204 at a higher rate, further reducing the buildup of backpressure with the torque converter.

Figure 11:
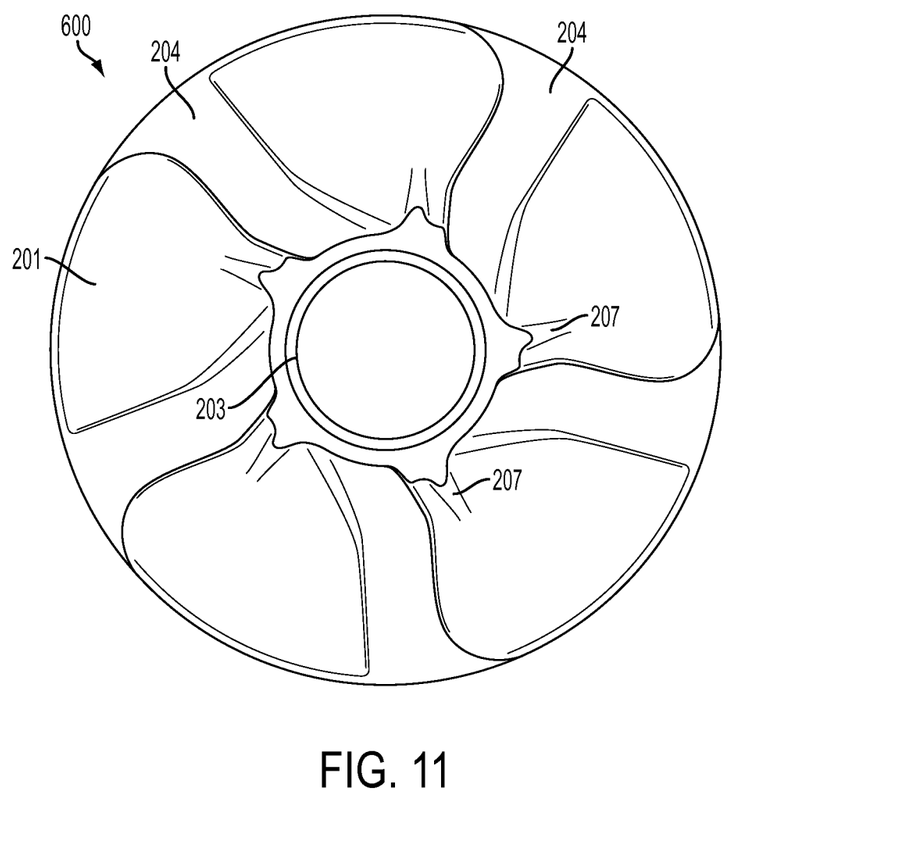
FIG. 11 is a front view of a fifth embodiment of a thrust washer according to the present invention.

FIG. 11 is a front view of a fifth embodiment of a thrust washer 600 usable with the stator of the present invention. In this fifth embodiment, the thrust washer 600 further includes protrusions 207 extending outward from the front surface of the thrust washer 600. The protrusions 207 are located between adjacent grooves 204 and in proximity to the inner diameter 203 of the thrust washer 600. The protrusions 207 influence the direction of the fluid within the space between the thrust washer 600 and the cover of the torque converter and therefore further assist in increasing the fluid flow rate within the torque converter.

The thrust washer 200 is fabricated from a solid material such as a phenolic, plastic, polyimide resin, or metal. The overall dimensions of the thrust washer 200, including the size of the inner diameter 203, outer diameter 202, and the thickness of the annular body 201, are not limited except so as to allow for the proper positioning and functioning of the component parts of the torque converter. Furthermore, the depth, width, and quantity of the grooves 204 are not limited and can be selected in any number to allow for an adequate fluid flow rate between the inner diameter 203 and the outer diameter 202 of the thrust washer 100 for desired functioning of the torque converter.

It is contemplated that an improved torque converter is provided having a stator as disclosed herein. Further the torque converter can include a non-ruled impeller and/or a turbine with non-ruled blades to further improve fluid flow. Further the torque converter can include an embodiment of the thrust washer as disclosed herein. Of course other combinations of the above torque converter components can be utilized to provide a desirable configuration and performance. Embodiments of the invention disclosed herein provide a torque converter with increased fluid flow capability and otherwise improved fluid flow properties such as reduced fluid turbulence and increased torque converter efficiency.

What is claimed is:

1. A torque converter comprising:
   a cover;
   an impeller attached to the cover, the impeller having a plurality of impeller blades, each impeller blade having a front surface and a rear surface;
   a turbine between the impeller and the cover, the turbine having a plurality of turbine blades, each turbine blade having a front surface and a rear surface;
   a thrust washer between the cover and the impeller, the thrust washer comprising:
      an annular body having a front surface, an inner diameter, and an outer diameter;
      a plurality of grooves arranged radially along the front surface and extending from the outer diameter towards the inner diameter, the grooves having a first side, a second side opposite the first side, and a width; and
      a plurality of protrusions extending outward from the front surface and located between adjacent grooves in proximity to the inner diameter wherein the front surface is curved such that a thickness of the thrust washer is greater at the inner diameter than at the outer diameter; and
   a stator between the impeller and the turbine, the stator comprising:
      an inner circumference;
      an outer circumference;
      a plurality of stator blades between the inner circumference and outer circumference, each stator blade having a leading edge, a trailing edge, a front surface and a rear surface;
      wherein the leading edge and the trailing edge are non-linear from the inner circumference to the outer circumference, and the stator blade includes a non-ruled surface.

2. The torque converter of claim 1, wherein the stator blades are non-linear from the leading edge to the trailing edge.

3. The torque converter of claim 1, wherein the stator blades have an airfoil shaped cross-section from the leading edge to the trailing edge.

4. The torque converter of claim 1, wherein the stator blades have a uniform cross-section from the leading edge to the trailing edge.

5. The torque converter of claim 1, wherein the stator blades have a convex front surface and a concave rear surface.

6. The torque converter of claim 1, wherein the stator blades have a concave front surface and a convex rear surface.

7. The torque converter of claim 1, wherein the impeller blade includes a non-ruled surface.

8. The torque converter of claim 1, wherein the turbine blade includes a non-ruled surface.

9. The torque converter of claim 1, wherein the width of the grooves of the thrust washer are greater at the outer diameter than at a point proximal to the inner diameter.

10. The torque converter of claim 1, wherein the first side of the grooves of the thrust washer are curved along at least part of a length thereof.

11. The torque converter of claim 10, wherein the second side of the grooves of the thrust washer are curved along at least part of a length thereof.

12. The torque converter of claim 1, wherein the grooves of the thrust washer extend from the outer diameter to the inner diameter.

13. A thrust washer for a torque converter having an impeller and a cover, the thrust washer comprising:
   an annular body having a front surface, an inner diameter, and an outer diameter;
   a plurality of grooves arranged radially along the front surface and extending from the outer diameter towards the inner diameter, the grooves having a first side, a second side opposite the first side, and a width; and
   a plurality of protrusions extending outward from the front surface and located between adjacent grooves in proximity to the inner diameter;
   wherein the front surface is curved such that a thickness of the thrust washer is greater at the inner diameter than at the outer diameter;
   wherein the thrust washer is configured to be positioned between the cover and the impeller of the torque converter.

14. The thrust washer for the torque converter of claim 13, wherein the width of the grooves of the thrust washer are greater at the outer diameter than at a point proximal to the inner diameter.

15. The thrust washer for the torque converter of claim 13, wherein the first side of the grooves of the thrust washer are curved along at least part of a length thereof.

16. The thrust washer for the torque converter of claim 15, wherein the second side of the grooves of the thrust washer are curved along at least part of a length thereof.

17. The thrust washer for the torque converter of claim 13, wherein the grooves of the thrust washer extend from the outer diameter to the inner diameter.

* * * * *